Figure 1:
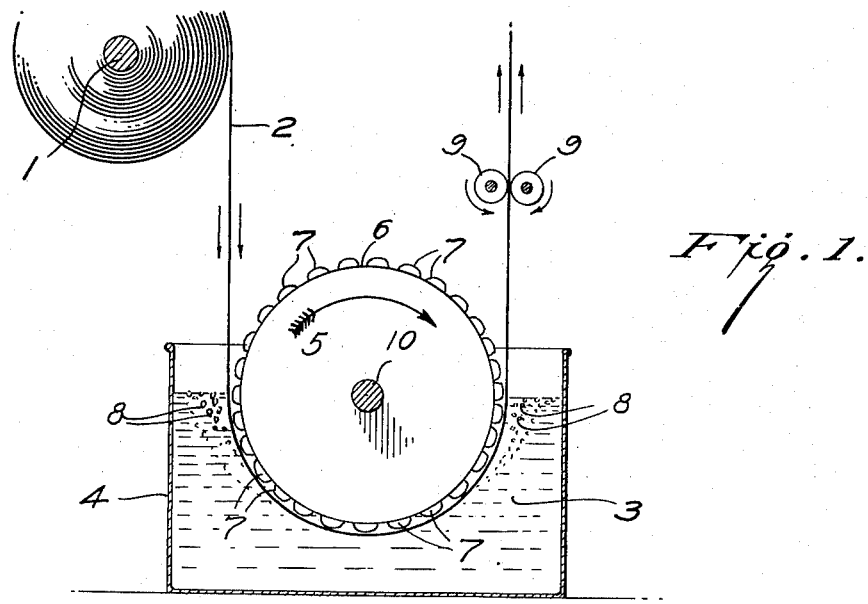

Feb. 20, 1951     E. L. KROPA     2,542,819
METHOD OF IMPREGNATING FIBROUS SHEET MATERIALS
Filed Jan. 21, 1947

INVENTOR
EDWARD L. KROPA,
BY
Harold L. Kauffman
ATTORNEY

Patented Feb. 20, 1951

2,542,819

UNITED STATES PATENT OFFICE 2,542,819

METHOD OF IMPREGNATING FIBROUS SHEET MATERIALS

Edward L. Kropa, Old Greenwich, Conn., assignor to American Cyanamid Company, New York, N. Y., a corporation of Maine Application January 21, 1947, Serial No. 723,359

5 Claims. (Cl. 117—7)

This invention relates to an improved method of impregnating fibrous sheet materials with a liquid impregnating composition, more particularly a liquid resin. The invention especially is concerned with a method of impregnating fibrous sheet materials such as those containing or composed of twisted fibers, e. g., twisted glass fibers, with a liquid resin, e. g., a thermosetting resin in liquid state, which comprises effecting contact between said resin and said sheet material, e. g., by immersing the sheet material in the liquid resin, and imparting an undulating motion to the sheet material while in contact with the resin thereby to release any gas (e. g., air) entrapped within the interstices of the sheet material. The twisted fibers are caused by this motion, which is both a forward and side undulating motion, at least partly to untwist while in contact with the resin. As the entrapped air or other gas is caused to escape by this action, the liquid resin fills the voids left by the gas and better wetting of the sheet material with the resin results.

In the production of laminated articles from fibrous sheet materials, e. g., cloth made from cotton, linen, rayon, glass fibers, etc., the sheet material usually is passed through a solution of a resin. If the viscosity of the resin solution is high, poor wetting of the sheet material occurs, with the result that the finished laminate is of poor quality. By increasing the amount of solvent in the resin solution, thereby lowering its viscosity, it is possible to obtain better wetting of the sheet material with the solution. The use of additional solvent adds to the cost of the process, since in the case of an organic solvent it is lost during the subsequent drying operation unless costly solvent-recovery equipment be installed, and with either aqueous or organic solvents additional heat is required to volatilize the solvent from the treated sheet material during the drying operation.

In the case of some liquid, resinous impregnating compositions it is highly undesirable to lower the viscosity by diluting the resin with a solvent. Examples of such materials are liquid polymerizable compositions comprising (1) an unsaturated alkyd resin, e. g., diethylene glycol maleate, diethylene glycol fumarate sebacate, etc., and (2) a reactive solvent which is a liquid monomeric material containing a $CH_2=C<$ grouping and which is copolymerizable with the alkyd resin of (1), e. g., styrene, diallyl phthalate, etc. When the unsaturated alkyd resin is dissolved in the reactive solvent, a viscous liquid composition results. Since the proportions of unsaturated alkyd resin and reactive solvent in such a composition are predetermined on the basis of the physical and other properties desired in the final product, any variation in the ratio of the reactive solvent to the unsaturated alkyd resin causes a variation in the properties of the copolymer of the solvent and the resin and, also, in the properties of the laminated article comprising superimposed fibrous sheet materials bonded together with such copolymer. Although in some cases it is possible to incorporate chemical modifiers, e. g., wetting agents, into such viscous compositions to improve the ability of the composition to wet and impregnate the sheet material, such modifiers often have a deleterious effect upon the polymerization characteristics of the composition and upon the properties of the final product.

In impregnating fibrous sheet materials with liquid resinous compositions, including those described in the preceding paragraph, it is highly desirable that air or other gas entrapped within the interstices of the sheet material be removed during the impregnating operation. Such entrapped gas may result in blistering of the laminated article made from the impregnated sheet, or in weakening the bond between the superimposed sheets. Furthermore, in the case of sheets or laminates used in electrically insulating applications, any gas pockets or voids present therein are particularly objectionable. This is because the dielectric strength of the insulating material is impaired as a result of the corona formed in such gas pockets or voids under a high voltage stress.

The presence of entrapped air or other gas also is objectionable in certain transparent, decorative laminated articles, since the gas tends to scatter the light so that a visual appearance different from that desired is obtained. Air likewise is objectionable in liquid polymerizable compositions which cure or polymerize to a resinous state by loss of unsaturation, since air generally inhibits the cure or polymerization of such compositions.

The present invention is based on my discovery that the foregoing difficulties in the impregnation of fibrous sheets, especially those composed of or containing twisted fibers of glass, and in the production of laminated articles therefrom, can be obviated by practicing the method broadly described in the first paragraph of this specification and more specifically hereafter. The method is applicable to the impregnation of sheet materials comprised or composed of matted or woven sheet textile materials, e. g., sheet materials comprised or formed of matted glass fibers, woven sheet materials comprised or formed of twisted glass fibers in continuous or discontinuous lengths, etc. For example, one embodiment of the invention comprises the steps of immersing a sheet material formed of matted fibers, specifically matted glass fibers, in a liquid resin, for instance a solution containing a thermosetting resin, e. g., an unsaturated alkyd resin, a phenol-formaldehyde resin, a urea-formaldehyde resin, etc., and mechanically working the sheet material while immersed in the liquid resin, for example by methods such as hereafter described, so as to release air or other gas entrapped within the interstices of the sheet material. In this way better wetting of the sheet material with the liquid resin and other improvements of the kind hereinbefore described are obtained. The methods of this invention may be carried out in either batch, semicontinuous or continuous operations, but for economical reasons the latter preferably is employed. Such an embodiment of the invention comprises, for instance, the steps of continuously passing a fibrous sheet material, e. g., a woven sheet material comprised of twisted glass fibers, through a bath of a liquid resin, for instance, a solution containing a thermosetting resin, and mechanically working the material during its passage through the bath so as at least partly to untwist fibers thereof and thereby to release air or other gas entrapped within the interstices of the material.

Figure 2:
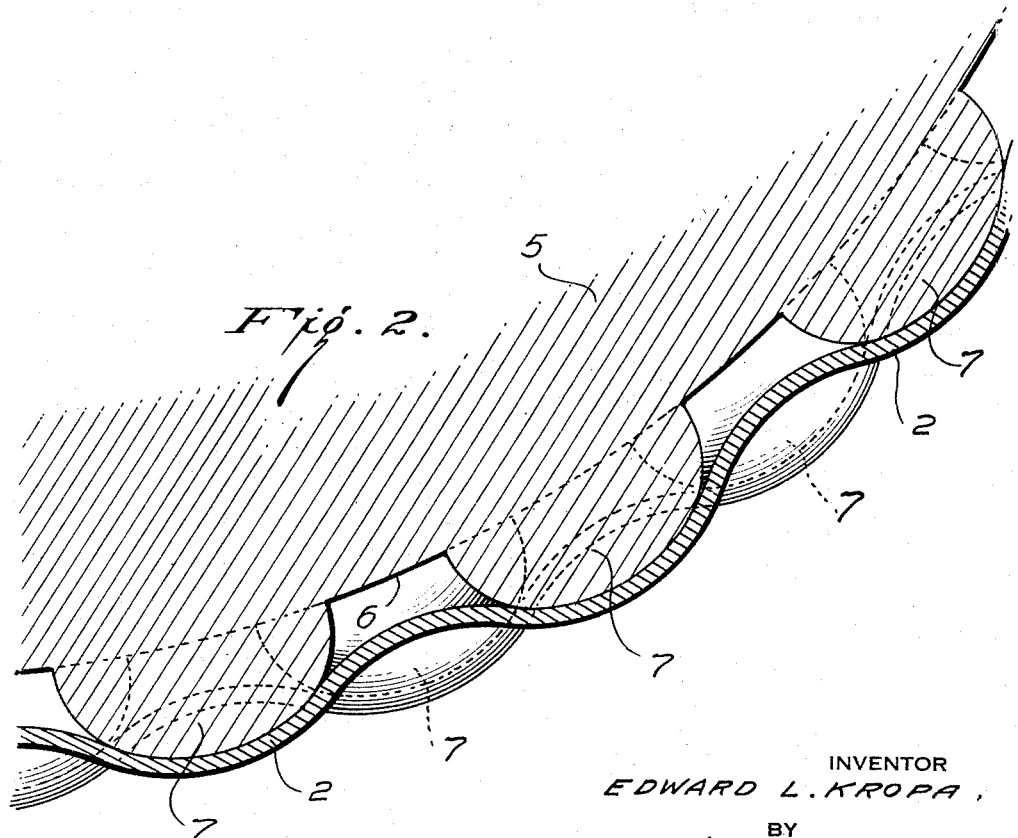

The novel features which are characteristic of my invention are set forth in the appended claims. The invention itself, however, will best be understood from the following more detailed description and illustrative examples, especially when considered in connection with the accompanying drawing wherein Fig. 1 is a diagrammatic view of apparatus illustrating one means of carrying the invention into effect, and Fig. 2 is an enlarged view of a portion of the apparatus shown in Fig. 1.

In the drawing, the numeral 1 designates a pay-off reel from which the fibrous sheet material 2, which may be, for example, a woven sheet material comprised of twisted glass fibers, is drawn through the bath of liquid resin 3 contained in the tank 4 by any suitable means. In this bath the sheet material passes over a roll 5 immersed therein. The roll has, on its exterior horizontal surfaces 6, spaced projections 7, which preferably are substantially uniformly spaced over the said surfaces of the roll. These projections are adapted at least partly to untwist the fibers of the sheet material during its passage over the roll in contact with the projections. The sheet material 2 engages the roll 5 in operative relationship beneath the surface of the liquid resin 3. Preferably the plurality of projections 7 distributed on the exterior surfaces of the roll 5 are smooth, circular, knob-like projections. During the passage of the sheet material over the roll, twisted fibers thereof are gently untwisted without rupturing or breaking them and any air or gas on or between the twisted filaments or twisted strands of filaments is released. Such released gas in the form of bubbles is shown at 8. The untwisted fibers are allowed to retwist upon removal of the sheet material from the bath.

After its passage over the roll 5 the treated fibrous sheet material preferably is passed between the squeeze rolls 9, which move in opposite directions as shown, thereby removing excess resin from the sheet material.

The impregnated sheet material after removal from the bath, and after passage through the squeeze rolls if employed, is then suitably treated to cause the liquid resin to solidify in situ in and on the sheet material. If the liquid resin is one which solidifies on cooling, e. g., rosin, this may be done merely by allowing the impregnated sheet material to cool. On the other hand, if the treated material requires heat to solidify the resin impregnant, this may be done by passing the impregnated sheet material through a suitably heated oven or chamber (not shown). If the impregnating composition is a solution of a thermosetting resin in a volatile solvent, e. g., water, alcohol, water-alcohol mixtures, mineral spirits, etc., the treated sheet material is heated in the oven at a temperature sufficiently high to volatilize the solvent and to advance the cure of the resin in situ to the point desired. If the impregnating composition contains a reactive solvent, e. g., styrene, diallyl phthalate, etc., which is copolymerizable with the resin component, e. g., an unsaturated alkyd resin, then the treated sheet material is heated in the oven at a temperature sufficiently high, e. g., from 60° to 200° C. or higher, but below the temperature at which the fibrous sheet material would be detrimentally affected, e. g., charred in the case of organic fibrous sheet materials, thereby to effect in situ the desired degree of copolymerization of the said solvent and resin.

The roll 5 may be mounted rigidly in the bath of liquid resin. Or, for more efficient results, the roll may be caused to move in the bath in a direction opposite to that in which the sheet material is passing through the bath. This may be done, for instance, by mounting the roll on a shaft 10 which is driven by suitable means (not shown). By means of either a stationary or a moving roll the sheet material in passing over the roll is caused to vibrate or undulate in such a manner as to temporarily untwist the twisted filaments or fibers of the sheet material comprising the same, whereby entrapped air or other gas is released and the liquid resin penetrates the gas-free interstices of the sheet material. After passage over the roll the untwisted fibers retwist to substantially their original form by reason of their springy action and the mild manner in which they have been untwisted. Either a single or a plurality of stationary or moving rolls may be immersed in the bath of liquid resin, and the sheet material passed over these rolls in engaging contact therewith as hereinbefore described. A combination of stationary and moving rolls may be used if desired.

In some cases it may be desirable to effect the impregnating operation under reduced pressure, e. g., a pressure ranging from 100 to 750 mm. mercury per square inch. In such a case the tank containing the liquid resin and the roll or rolls is sealed, suitable provisions being made for the passage therethrough of the sheet material, and the tank and contents are maintained under reduced pressure.

My invention is particularly applicable to the treatment of fibrous sheet materials with a liquid polymerizable resin which contains a reactive solvent as the sole solvent ingredient. Such liquid resins may be applied to the sheet material in a single step or in a plurality of steps, using the same or different liquid resins as the impregnant. Illustrative of the latter technique is the method which comprises continuously passing a fibrous sheet material, e. g., a woven sheet material formed of twisted glass fibers, through a bath of a liquid monomeric material containing a $CH_2=C<$ grouping and which is copolymerizable with an unsaturated alkyd resin, e. g., styrene, diallyl phthalate, etc. During its passage through this bath the sheet material is passed over either a stationary or revolving roll of the kind shown at 5 in Fig. 1 and hereinbefore described. Thereafter the treated sheet material is passed through a bath of a different liquid polymerizable composition, for example, one comprising (1) an unsaturated alkyd resin, (2) a monomeric material containing a $CH_2=C<$ grouping which is copolymerizable with the alkyd resin of (1) and (3) a catalyst for accelerating the copolymerization of the ingredients of (1) and (2). The monomeric material of (2) may be the same or different from the liquid monomer employed in the first bath as the impregnant through which the sheet material is passed. The second bath may contain a stationary or revolving roll of the kind used in the first bath and over which the sheet material is passed; or, if desired, the roll may be omitted and the sheet may be impregnated in this bath in accordance with conventional practice. By this method of impregnation it is possible to use an impregnant of lower viscosity and hence of better penetrating characteristics in the first bath. If desired, the sheet material may be passed through a series of baths containing different impregnants as above described, which baths may be maintained at the same or different temperatures; for example, the second bath may be maintained at a higher temperature than the first one, or vice versa. After passing through the second bath or through the last bath of a series if such has been employed, the impregnated sheet material is heated at a temperature and for a time sufficient to form in situ a solid copolymer of the alkyd resin and monomeric material copolymerizable therewith.

The following exampels are given by way of illustration in order further to teach those skilled in the art the principles involved and how the present invention may be carried into effect. All parts are by weight.

*Example 1*

This example illustrates the results obtained when a fibrous sheet material, e. g., a mat of unwoven glass fibers, is poorly wetted by a liquid resin.

A mat of unwoven glass fibers in which the latter had been oriented so that all fibers were parallel and in the form of more or less tightly compressed bundles was impregnated with a liquid polymerizable composition comprising (1) one part of styrene, (2) two parts of a resin obtained by reacting 6 mols of diethylene glycol, 5 mols of fumaric acid, and 1 mol of sebacic acid and (3) 0.015 part of lauroyl peroxide as a polymerization catalyst.

The resulting impregnated sheet material was cured by heating for 1 hour at 100° C. between glass plates under contact pressure. Certain areas of the cured sheet material possessed a good degree of transparency. The transparent portions had a definite violet cast. However, scattered opaque streaks were present throughout the product. Upon close examination these streaks were found to be bundles of glass fibers which had been poorly wetted by the liquid resin.

*Example 2*

A mat of unwoven glass fibers of the kind employed in Example 1 was gently worked under a liquid polymerizable composition by flexing the mat so as to open up the closely-packed fiber bundles and to separate the individual glass filaments. The liquid polymerizable composition was similar to that described under Example 1 with the exception that the resin component of (2) was formed by reacting 5 mols of diethylene glycol, 5½ mols of fumaric acid and 1 mol of oleyl alcohol. The impregnated sheet material was cured in the same manner as set forth under Example 1. The cured product had a substantially uniform transparency, was free from streaks (showing good wetting) and had an orange-colored cast.

*Example 3*

A mat of unwoven glass fibers of the kind employed in Example 1 was placed upon a glass plate and covered with a sheet of cellophane. A straight edge was held crosswise on the cellophane and pressed firmly down on the mat of glass fibers while it was drawn in the direction of the fiber axis. This operation was repeated several times until the fiber bundles were adequately opened. The resulting mat was treated with a liquid polymerizable composition of the kind described under Example 1. The impregnated mat of glass fibers was cured by heating for 1 hour at 100° C. between glass plates under contact pressure. An impregnated, somewhat opaque, sheet material which was substantially free from streaks was obtained.

On a continuous operating basis the unworked mat of glass fibers may be treated with liquid resin, the saturated mat placed between sheets of a flexible protective medium, e. g., cellophane, and the resulting assembly passed over a "button breaker" such as roll 5 (Fig. 1) to open up the glass filaments of the mat and obtain more complete impregnation thereof with the liquid resin.

*Example 4*

The same as Example 3 with the exception that the liquid polymerizable composition consisted of 60 parts of an alkyd resin obtained by reacting 6 mols of diethylene glycol, 5 mols of fumaric acid and 1 mol of sebacic acid, 40 parts of diallyl phthalate and 2 parts of lauroyl peroxide. The impregnated mat of glass fibers was cured by heating for 2 hours at 100° C. between glass plates under contact pressure. A cured impregnated sheet material having a good degree of transparency and a yellowish cast was obtained.

*Example 5*

Unwoven bundles of glass fibers oriented in one direction were treated with a liquid polymerizable composition consisting of (1) one part of styrene, (2) two parts of an unsaturated alkyd resin having an acid number of 50 and obtained by reaction of 6 mols of diethylene glycol, 5 mols of fumaric acid and 1 mol of sebacic acid, (3) 0.003 part of hydroquinone and (4) 0.09 part of benzoyl peroxide. The impregnated bundles of glass fibers were cured for one hour at 100° C. under contact pressure, yielding a sheet material which possessed opaque streaks. Microscopic examination revealed that these streaks were caused by the presence of highly twisted glass fibers. When the oriented bundles of glass fibers were worked while immersed in the liquid composition in order to untwist the fibers and to release entrapped air, a clear, cured, impregnated sheet material characterized by a marked Christiansen effect was obtained.

Example 6

A sheet of woven glass fabric material was impregnated with a liquid polymerizable composition of the kind described in Example 5. The impregnated fabric was cured between two sheets of glass for 1 hour at 100° C. under contact pressure, yielding an opaque sheet material.

The same procedure was followed as described above with the exception that during the impregnating operation the glass fabric material was worked on a washboard so as at least partly to untwist the glass fibers of the fabric and thereby release entrapped air. Upon curing the resulting impregnated fabric in the same manner as described above, a corrugated sheet material characterized by a high degree of transparency was obtained. This sheet material was suitable for use as a diffusing screen for fluorescent lighting.

The method of the present invention is applicable to the impregnation of fibrous sheet materials, especially woven or matted textile materials formed of glass fibers, with any liquid resin, examples of which have been given hereinbefore. However, it is particularly suitable for use when the liquid impregnant is a polymerizable monomer or a mixture of copolymerizable materials.

Illustrative examples of polymerizable materials which may be used alone or in the form of mixtures with other copolymerizable compounds are those which contain a $CH_2=C<$ grouping, more particularly an allyl ($CH_2=CH-CH_2-$) grouping, especially those having a boiling point of at least about 60° C. Examples of allyl compounds that may be employed are allyl acrylate, allyl methacrylate, diallyl maleate, diallyl fumarate, diallyl phthalate, diallyl succinate, triallyl aconitate, triallyl phosphate, etc.

Examples of other impregnants that may be used alone or in the form of admixtures, e. g., with an unsaturated alkyd resin, are the unsaturated alcohol esters, e. g., the allyl, methallyl, crotyl, vinyl, butenyl, etc., esters of saturated and unsaturated, aliphatic and aromatic, monobasic and polybasic acids such, for instance, as acetic, propionic, acrylic, alkacrylic (e. g., methacrylic, ethacrylic, etc.), succinic, adipic, maleic, fumaric, phthalic, etc., acids; the saturated monohydric alcohol esters, e. g., the methyl, ethyl, propyl, butyl, etc., esters of unsaturated aliphatic monobasic and polybasic acids, illustrative examples of which appear above; vinyl cyclic compounds, e. g., styrene, chlorostyrenes, dichlorostyrenes, methyl styrenes, dimethyl styrenes, vinyl naphthalene, vinyl furane, divinyl benzene, etc.; unsaturated amides, for instance, acrylamide and N-substituted acrylamides, e. g., N-methylol acrylamide, N-methyl acrylamide, N-allyl acrylamide, etc.; methylene malonic esters, e. g., methylene methyl malonate, etc.; and similar compounds.

Instead of using a compound containing a $CH_2=C<$ grouping, I may employ other polymerizable materials, e. g., resins possessing a plurality of polymerizably reactive alpha,beta-enal groups, that is, the grouping

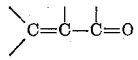

and which are herein designated as "unsaturated alkyd resins." Such resins are produced, for example, by the esterification of an unsaturated alpha,beta-unsaturated polycarboxylic acid of the aliphatic series, more particularly an alpha,- beta-unsaturated polycarboxylic acid, with a polyhydric alcohol, e. g., a glycol. The term "acid" and more specifically "polycarboxylic acid" as used herein includes within its meaning the anhydride thereof if available. The unsaturated alkyd resin is preferably one having an acid number not greater than 50, although in some cases resins having an acid number as high as 100 may be employed. The term "unsaturated alkyd resin" as used herein does not include within its meaning the conventional drying oil acid-modified alkyd resins in the preparation of which an aromatic or saturated aliphatic polycarboxylic acid or anhydride is employed.

Illustrative examples of unsaturated alkyd resins that may be used, preferably in the form of an admixture with a reactive solvent, are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; fumaric acid, diethylene glycol and linseed oil fatty acid monoglycerides; etc. Reference is made to various copending applications of mine for more detailed information regarding the ingredients, the preparation, and additional examples of modified and unmodified unsaturated alkyd resins that may be employed in liquid state, e. g., in solution in a reactive solvent, in practicing the present invention, for instance, my copending applications Serial Nos. 540,142, filed June 13, 1944, now U. S. Patent No. 2,443,740, 555,194, filed September 21, 1944, now U. S. Patent No. 2,443,741, 564,723, filed November 22, 1944, 616,648, filed September 15, 1945, 653,959, filed March 12, 1946, now U. S. Patent No. 2,485,294, 700,833, filed October 2, 1946, now U. S. Patent No. 2,510,503 and 702,599, filed October 11, 1946. Other monomeric materials containing a $CH_2=C<$ grouping may be used, e. g., in the form of an admixture with an unsaturated alkyd resin, are disclosed, for instance, in my aforementioned copending application Serial No. 700,833.

When the liquid impregnant is a mixture of copolymerizable materials, the proportions thereof may be varied as desired or as conditions may require. For example, in the case of a liquid polymerizable composition comprising an unsaturated alkyd resin and a monomeric material containing a $CH_2=C<$ grouping which is copolymerizable therewith, the proportions thereof in the polymerizable mixture ordinarily will be within the range of, by weight, from about 10 to 90 per cent of the former to from about 90 to 10 per cent of the latter, preferably from about 30 to 70 per cent of the former to about 70 to 30 per cent of the latter.

In some cases it may be desirable to incorporate a polymerization inhibitor into a polymerizable liquid impregnant. Suitable polymerization inhibitors for this purpose are phenolic compounds, especially the polyhydric phenols, and aromatic amines. Specific examples of this group of inhibitors are hydroquinone, benzaldehyde, ascorbic acid, isoascorbic acid, resorcinol, tannin, sym. di-(beta-naphthyl)-p-phenylene diamine, phenolic resins, sulfur compounds, etc. The concentration of the inhibitor is preferably low, and less than about 1% by weight of the polymerizable composition is usually sufficient. However, with the preferred inhibitors, e. g., polyhydric phenols and aromatic amines, I prefer to use only about 0.01 to about 0.1% by weight of inhibitor, based on the weight of the polymerizable composition.

Any suitable means may be used in effecting polymerization of the polymerizable compositions used in practicing the present invention. Heat or light or both, with or without a polymerization catalyst, may be employed. Ultraviolet light is more effective than ordinary light. The polymerization of the polymerizable composition is preferably accelerated by incorporating a polymerization catalyst therein. The polymerization catalysts include the organic superoxides, alcoholic and acidic peroxides. Among the preferred catalysts are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide, and oleic peroxide; alcohol peroxides, e. g., tertiary-butyl hydroperoxide; and terpene oxides, e. g., ascaridole. Still other polymerization catalysts may be used in some cases, e. g., soluble cobalt salts (particularly the linoleate and naphthenate), p-toluene sulfonic acid, aluminum chloride, stannic chloride, boron trifluoride, etc.

The concentration of the catalyst employed is usually small, i. e., for the preferred catalysts from, by weight, about 1 part catalyst per thousand parts of the material or mixture of materials to be polymerized to about 2 parts catalyst per hundred parts of the said material or mixture. If an inhibitor be present, up to 5% or even more by weight of catalyst, based on the weight of the polymerizable composition, may be necessary according to the concentration of the inhibitor. In most cases the temperature of polymerization or copolymerization will be within the range of 40° to 200° C., usually within the range of 60° to 130° C., depending upon the particular polymerizable composition employed, the particular catalyst, if any, used, the rapidity of polymerization or copolymerization wanted and other influencing factors.

Various fibrous sheet materials may be impregnated with a liquid resin by the method of this invention. Examples of such sheet materials are those comprising woven or unwoven (e. g., felted, matted, etc.) organic or inorganic fibers, e. g., fibers, more particularly twisted fibers, of cotton, linen, silk, wool, ramie, glass, asbestos, and various synthetic fibers, e. g., polyacrylonitrile, nylon, rayon, and fibers derived from casein, soyabean, etc.

The terms "fibers" and "twisted fibers" as used generically herein and in the appended claims include within their meanings both monofilaments in continuous lengths (continuous filaments) and discontinuous lengths (staple fibers), and single and multiple strands obtained by twisting or otherwise combining a plurality of such filaments to form a thread or a yarn which can be woven or otherwise fabricated to yield a fibrous sheet material.

I claim:
1. The method of impregnating woven sheet material comprised of twisted fibers with a resin which comprises continuously passing said sheet material through a bath of said resin and at least partially untwisting said fibers of said material by imparting a simultaneous forward and side undulating motion to said material while in contact with said resin whereby gas entrapped within said material is released, said forward and side undulating motion being imparted to said material by passing said material in operative relationship with a roll rotating in a direction opposite to the direction in which said sheet material is passing through said bath and having distributed on its exterior surfaces a plurality of smooth, circular, knob-like, spaced projections.

2. The method of impregnating woven sheet material comprised of twisted glass fibers with a resin which comprises continuously passing said sheet material through a bath of said resin and at least partially untwisting and retwisting said fibers of said material by imparting a simultaneous forward and side undulating motion to said material while in contact with said resin whereby gas entrapped within said material is released, said forward and side undulating motion being imparted to said material by passing said material in operative relationship with a roll rotating in a direction opposite to the direction in which said sheet material is passing through said bath and having distributed on its exterior surfaces a plurality of smooth, circular, knob-like, spaced projections.

3. The method of impregnating woven sheet material comprised of twisted glass fibers with a solution containing a thermosetting resin which comprises continuously passing said sheet material through a bath of said resin and at least partially untwisting said fibers of said material by imparting a simultaneous forward and side undulating motion to said material while in contact with said resin whereby gas entrapped within said material is released and said solution is permitted to fill the voids left by said released air, said forward and side undulating motion being imparted to said material by passing said material in operative relationship with a roll rotating in a direction opposite to the direction in which said sheet material is passing through said bath and having distributed on its exterior surfaces a plurality of smooth, circular, knob-like, spaced projections.

4. The method of impregnating woven sheet material comprised of twisted glass fibers with a resin which comprises continuously passing said sheet material through a bath of a liquid polymerizable composition, at least partially untwisting and retwisting said fibers of said material by imparting a simultaneous forward and side undulating motion to said material while in contact with said liquid polymerizable composition whereby gas entrapped within said material is released, and polymerizing the said polymerizable composition in situ to a solid state after removal of the treated sheet material from said bath, said forward and side undulating motion being imparted to said material by passing said material in operative relationship with a roll rotating in a direction opposite to the direction in which said sheet material is passing through said bath and having distributed on its exterior surface a plurality of smooth, circular, knob-like, spaced projections.

5. The method of impregnating woven sheet material comprised of twisted glass fibers with a resin which comprises continuously passing said sheet material through a bath of a liquid polymerizable composition comprising (1) an unsaturated alkyd resin, (2) a monomeric material containing a $CH_2{=}C{<}$ grouping and which is copolymerizable with the alkyd resin of (1), and (3) a catalyst for accelerating the copolymerization of the ingredients of (1) and (2), at least partially untwisting and retwisting said fibers of said material by imparting a simultaneous forward and side undulating motion to said material while in contact with said liquid polymerizable composition whereby gas entrapped within said material is released and said polymerizable composition is permitted to fill the voids left by said released gas, passing the treated sheet material through squeeze rolls to remove the excess liquid composition therefrom, and thereafter heating the impregnated sheet material to form in situ a solid copolymer of said alkyd resin and said monomeric material copolymerizable therewith, said forward and side undulating motion being imparted to said material by passing said material in operative relationship with a roll rotating in a direction opposite to the direction in which said sheet material is passing through said bath and having distributed on its exterior surface a plurality of smooth, circular, knob-like, spaced projections.

EDWARD L. KROPA.

REFERENCES CITED

The following references are of record in the file of this patent:

UNITED STATES PATENTS

| Number | Name | Date |
|---|---|---|
| 1,268,430 | Cady | June 4, 1918 |
| 1,953,799 | Eaton | Apr. 3, 1934 |
| 2,040,105 | Ritzert | May 12, 1936 |
| 2,176,835 | Cumfer | Oct. 17, 1939 |
| 2,209,850 | Shand et al. | July 30, 1940 |
| 2,273,891 | Pollack et al. | Feb. 24, 1942 |
| 2,421,876 | Gerhart | June 10, 1947 |

FOREIGN PATENTS

| Number | Country | Date |
|---|---|---|
| 531,910 | Germany | Aug. 17, 1931 |